April 28, 1964     J. A. MASQUELIER     3,131,123
ENTERIC TABLETS AND MANUFACTURE THEREOF
Filed Jan. 12, 1960
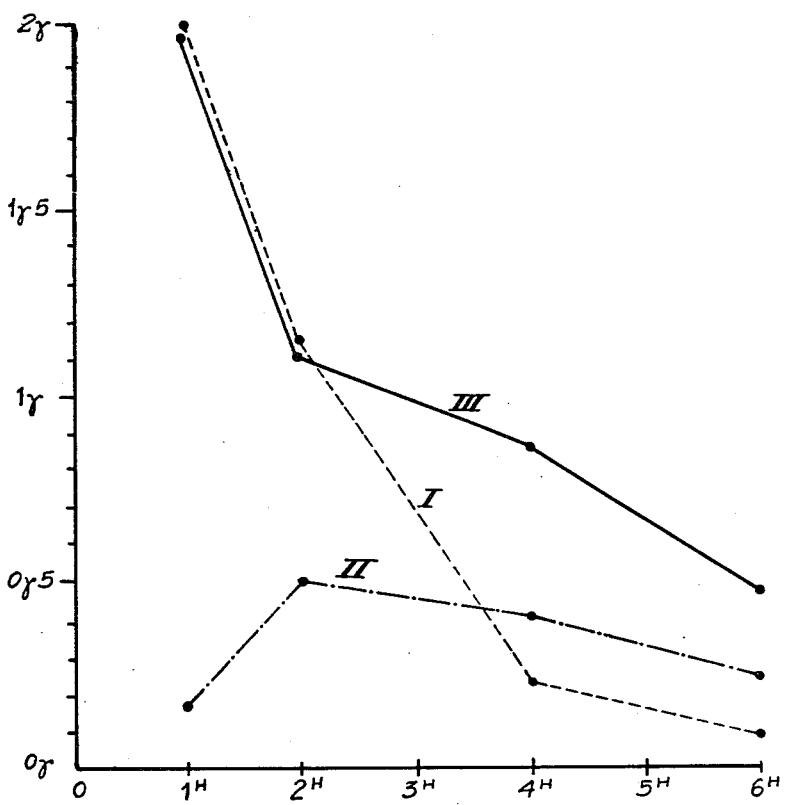

3,131,123
ENTERIC TABLETS AND MANUFACTURE THEREOF

Jack A. Masquelier, Bordeaux, France, assignor to Laboratoires Francais de Therapeutique, Bordeaux, France, a company of France
Filed Jan. 12, 1960, Ser. No. 1,938
Claims priority, application France Mar. 13, 1959
6 Claims. (Cl. 167—57)

The present invention relates to tablets intended to be administered per os and the inner principal of which is to be liberated only at the level of the small intestine after passing the gastric barrier.

The forms most commonly used, notably for pharmaceutical purposes, to achieve this result are constituted by intestinal capsules and pills.

An intestinal capsule denotes a capsule which is intended to contain in powder form the product which has to be ingested, this capusle being made of a material capable of passing the gastric barrier without suffering damage and while remaining impermeable, to be subsequently disintegrated within the intestine. The manufacture of such capsules requires the use of a special important material difficult to obtain, and this has inevitably an adverse effect on the cost price of the products.

The intestinal pill is constituted by a tablet the surface of which is provided with a covering not subject to attack by the gastric juice but one which dissolves in the intestinal secretion (a coating for example of gluten or salol).

Pills of this kind have some not inconsiderable disadvantages:

(1) They disintegrate only very slowly in the intestine, so that the medicinal compounds which they contain are liberated only after some delay (half an hour to two hours, depending on the coatings).

As a result, the therapeutic activity of the medicinal agents administered in this form is always dilatory (tardy intestinal liberation).

Moreover, because the pill crumbles very slowly, the ingredients are often set free only after the tablet has already travelled a considerable way through the small intestine. Thus the earlier portions of this intestine are no longer available for furthering the absorption of the drugs.

(2) Due to the fact that these compounds have been previously compressed into tablet form with the aid of strong pressures (5,000 kg. per sq. cm. approx.) the actual mass of the pill is only very rarely resolved into sufficiently fine powder.

Consequently, if they do not become soluble in the intestinal medium, there is a danger that they will be absorbed at most only very incompletely at the level of the villosities.

To sum up, it can be said that the intestinal pill is not a form which as a general rule can guarantee more than a very small coefficient of utilisation of the medicinal agents contained in it; a substantial proportion of these medicinal agents pass into the large intestine, to be ejected in the faeces, this proportion being often as high as 80%, and sometimes even higher.

The present invention relates to tablets free from such disadvantages.

The tablets according to the invention comprise a compressed core containing a mixture of a substance to be administered and an effervescent product, this core being covered by a protective coating immune to attack by the gastric juices.

The effervescent product is a gas-forming mixture usually constituted by association of a carbonate or bicarbonate and an organic acid of the citric or tartaric acid type, or a salt having a free acid functional group, for example cream of tartar.

The external protective layer may be one of those employed in the manufacture of ordinary intestinal pills, for example, gluten, salol, or cellulose acetate phthalate.

The method of production consists in mixing the active principle or substance to be administered, reduced to the form of a thoroughly desiccated powder, with a pulverulent compound generating gas by humidification, preferably generating $CO_2$, in compressing said mixture and covering it with a protective coating such as to permit the tablet to pass the gastric barrier without being attacked.

The process can only be used, of course, on condition that the gas-forming products employed are devoid of any effect on the medicinal principles constituting the basis of the pill.

Any compound or mixture of compounds known to generate gas by humidification can be used so long as it exists in solid and pulverulent form and does not exercise any toxic effects on the organism nor attack the mucous.

For the application of the outer protective layer, it is best for the central core to be previously coated with a moisture-resistant film adapted to prevent humidification of said central core; to this end, the invention proposes covering said core with a thin film of paraffin oil and/or sugar before dipping the pill in the product forming the outer covering.

The dispersion process occurring with pills according to the invention is as follows.

The outer covering enables the pills to stay in the stomach without the gastric juice being able to cause them to disintegrate. After passing the pyloric barrier, the outer layer of the pill on the other hand is attacked by the duodenal juice.

But as soon as this juice comes into contact with the central core, the latter rapidly crumbles, forming a sort of fine emulsion in the intestinal liquid, and this emulsion covering the intestinal villosities, thereby multiplying the points of absorption.

The principles composing the central core thus rapidly pass across the barrier of the enteric mucous and thence into the bloodstream.

By this process the central core of the pill is thus prevented from undergoing a prolonged passage through the intestinal tract, a phenomenon often met with in the case of ordinary pills.

The results which have been obtained with the pills according to the invention have exceeded all expectation: the rates of absorption are raised to a remarkable extent, making it possible to administer orally products which it would otherwise have been necessary to give by intramuscular or intravenous injection. In addition, the concentrations in the blood obtained with the aid of the pills according to the invention are remarkably sustained: they remain practically constant for 4 or 5 hours.

These results make it possible:

(a) To replace the administration of certain products through intramuscular or intravenous injection by an oral administration of such drugs.

(b) To reduce the posology substantially.

(c) To achieve nevertheless heightened therapeutic effects.

These advantages are combined with the further advantage from an industrial point of view, afforded by the invention, of simplicity of manufacture.

To assist elucidation, the invention will be described below through the medium of exemplified embodiments intended to illustrate its possibilities, its advantages and its results.

EXAMPLE I.—PENICILLIN PILL

The formula of the pill is as follows.

(a) Centre core:

| | | |
|---|---|---|
| Penicillin | u | 250,000 |
| Sodium bicarbonate | gr | 0.06 |
| Citric acid | gr | 0.04 |

The whole is thoroughly desiccated, mixed and compressed at 5,000 kg. per sq. cm.

(b) Protective coating:

The core thus constituted is covered, insulated by means of a film of paraffin oil, then with a protective layer of gluten as known, and coated with sugar.

Control

Two groups of patients are given an equal number of pills in accordance with the above formula and ordinary pills which do not contain any gas-forming mixture.

Blood samples are then taken at regular intervals, every two hours from the time of absorption. The penicillin is then measured in the serum by a conventional method.

It is found that the concentrations obtained in the case of the patients who had been given the pills in accordance with the invention are in the second hour about twice as high as the blood concentrations in those patients who were given ordinary pills.

Furthermore, whereas the penicillinaemia of the patients given the ordinary pills follows a decreasing curve, in the case of the patients who received the pills according to the invention it is found that this curve assumes a flat shape during four to five hours, before slowly decreasing.

It is therefore permissible to conclude that as the result of a rapid and more complete absorption of the penicillin, the drug has passed into the blood in a much more direct and more prolonged manner when administered in the form of the pills according to the invention.

EXAMPLE II.—SODIUM PARA-AMINO-SALICYLATE PILLS

The formula of the whole pill is as follows:

| | | |
|---|---|---|
| Sodium para-amino-salicylate | g | 0.50 |
| Sodium bicarbonate | g | 0.08 |
| Citric acid | g | 0.05 |
| Gluten | | Q.s. |

Sugar Coating

This is prepared in the same manner as in the foregoing example.

The control of these pills, by comparison of the blood concentrations obtained after their absorption with those obtained after absorption of ordinary pills shows that:

(a) In the second hour the blood concentration resulting from the absorption of the pills according to the invention is of the order of double that obtained in the case of ordinary pills.

(b) In the sixth hour the same concentration is approximately 3.5 times higher than that obtained with ordinary pills.

EXAMPLE III.—COMPOSITION OF THE CORE

| | | |
|---|---|---|
| Sodium para-amino-salicylate | g | 0.25 |
| Lithia carbonate | g | 0.06 |
| Tartaric acid | g | 0.04 |
| Starch | | Q.s. |

Coating

Protective coating against gastric acidity effected by double compression with the aid of a layer of cellulose acetate phthalate, 0.08 g. for each pill.

The results are shown in the accompanying graph, in which the abscissa records the period in hours at the end of which a blood sample was taken, the hour at which the drug was administered being taken as the starting point. As the ordinate is given the concentration in γ per cc. of blood as revealed by analysis of the blood thus taken. The graph relates to the administration of 1,000,000 units of penicillin by intramuscular injection (curve I), by ordinary intestinal pills (curve II) and by pills in accordance with the invention (curve III).

Examination of this graph shows that the invention permits results decidedly superior to those obtained by methods used heretofore.

Not only are the concentrations of curve III at 1 hr. and 2 hrs. higher than those of curve II, but they are practically equal to those of curve I (intramuscular injection).

From 2 hrs. onwards, notably after 4 hrs. and 6 hrs., the concentrations permitted by the invention are several times higher than those obtained both by intramuscular injection and ordinary pills.

It should be noted that the method is not necessarily intended for the preparation of pharmaceutical products but can be directed to the preparation of any products which are required to be dispersed in the small intestine. For example, the centre core might contain a contrast agent for the purpose of X-ray diagnosis the diffusion of which is required to be rapid and practically total from the beginning of the small intestine.

I claim:

1. An orally administrable effervescent enteric pill comprising a core of thoroughly desiccated and admixed powder comprised of a major amount of sodium para-amino salicylate in dry powdery form mixed with a dry powdery mixture of effervescent gas-forming materials selected from the group consisting of sodium bicarbonate with citric acid and lithia carbonate with tartaric acid, and the admixed core powder having then been compressed under strong pressure at approximately 5,000 kg./sq. cm., said compressed core being surrounded by an outer enteric coating selected from the group consisting of cellulose acetate phthalate, gluten, and salol, said outer enteric coating being dispersable in the intestinal fluids and immune to gastric juice whereby said core is exposed to the action of the intestinal fluids.

2. A pill according to claim 1, in which there is a film of paraffin oil underneath the outer enteric coating.

3. An orally administrable effervescent enteric pill comprising a core of thoroughly desiccated and admixed powder comprised of a major amount of penicillin in dry powdery form mixed with a dry powdery mixture of effervescent gas-forming materials selected from the group consisting of sodium bicarbonate with citric acid and lithia carbonate with tartaric acid, and the admixed core powder having then been compressed under strong pressure at approximately 5,000 kg./sq. cm., said compressed core being surrounded by an outer enteric coating selected from the group consisting of cellulose acetate phthalate, gluten, and salol, said outer enteric coating being dispersable in the intestinal fluids and immune to gastric juice whereby said core is exposed to the action of the intestinal fluids.

4. A pill according to claim 3, in which there is a film of paraffinic oil underneath the outer enteric coating.

5. An orally administrable effervescent enteric pill comprising a core of thoroughly desiccated and admixed powder comprised of a major amount of contrast agent for intestinal diagnosis in dry powdery form mixed with a dry powdery mixture of effervescent gas-forming materials selected from the group consisting of sodium bicarbonate with citric acid and lithia carbonate with tartaric acid, and the admixed core powder having then been compressed under strong pressure at approximately 5,000 kg./sq. cm., said compressed core being surrounded by an outer enteric coating selected from the group consisting of cellulose acetate phthalate, gluten, and salol, said outer enteric coating being dispersable in the intestinal fluids and immune to gastric juice whereby said core is exposed to the action of the intestinal fluids.

6. A pill according to claim 5, in which there is a film of paraffin oil underneath the outer enteric coating.

References Cited in the file of this patent

UNITED STATES PATENTS

| | | |
|---|---|---|
| 2,282,290 | Svedres | May 5, 1942 |
| 2,387,244 | Compton | Oct. 23, 1945 |
| 2,659,690 | Slabaugh | Nov. 17, 1953 |
| 2,753,288 | Visscher | July 31, 1956 |
| 2,801,203 | Leb et al. | July 30, 1957 |
| 2,853,420 | Lowey | Sept. 23, 1958 |
| 2,854,377 | Elias | Sept. 30, 1958 |
| 2,921,001 | McDermott | Jan. 12, 1960 |
| 2,928,770 | Bardani | Mar. 15, 1960 |
| 2,985,562 | Millard et al. | May 23, 1961 |
| 2,991,226 | Miller et al. | July 4, 1961 |
| 2,996,431 | Barry | Aug. 15, 1961 |
| 2,999,293 | Taff et al. | Sept. 12, 1961 |

FOREIGN PATENTS

| | | |
|---|---|---|
| 669,782 | Great Britain | Apr. 9, 1952 |

OTHER REFERENCES

Drug and Cos. Ind., October 1956, page 541.